(12) United States Patent
Oku et al.

(10) Patent No.: US 9,568,329 B2
(45) Date of Patent: Feb. 14, 2017

(54) ENERGY REPLENISHMENT QUANTITY CONTROL SYSTEM

(75) Inventors: Yusuke Oku, Toyota (JP); Takuji Yamada, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1111 days.

(21) Appl. No.: 12/597,279

(22) PCT Filed: Apr. 14, 2008

(86) PCT No.: PCT/JP2008/057281
§ 371 (c)(1),
(2), (4) Date: Oct. 23, 2009

(87) PCT Pub. No.: WO2008/133085
PCT Pub. Date: Nov. 6, 2008

(65) Prior Publication Data
US 2010/0138093 A1   Jun. 3, 2010

(30) Foreign Application Priority Data

Apr. 24, 2007   (JP) ................................ 2007-114405

(51) Int. Cl.
G06F 19/00   (2011.01)
G01C 21/34   (2006.01)
(Continued)

(52) U.S. Cl.
CPC ............ *G01C 21/3469* (2013.01); *B60L 11/18* (2013.01); *B60L 11/184* (2013.01);
(Continued)

(58) Field of Classification Search
CPC . B60L 11/1809; B60L 11/1838; B60L 11/184; B60L 11/1851; B60L 15/2045; B60L 2240/62; B60W 10/08; B60W 10/26; B60W 20/00; B60W 2510/244; B60W 2550/402; G01C 21/3469; Y04S 30/14; Y02T 10/56; Y02T 10/7005; Y02T 10/705; Y02T 10/7088; Y02T 10/7283; Y02T 10/7291; Y02T 90/128; Y02T 90/01
(Continued)

(56) References Cited

U.S. PATENT DOCUMENTS 5,892,346 A * 4/1999 Moroto et al. ................ 318/587
6,230,496 B1 * 5/2001 Hofmann et al. .............. 60/706
(Continued)

FOREIGN PATENT DOCUMENTS

DE   600 29 811 T2   3/2007
EP   1 168 567 A2    1/2002
(Continued)

OTHER PUBLICATIONS

Office Action issued in DE 11 2008 001 054.4 dated Jan. 27, 2012 and English translation thereof.

*Primary Examiner* — Thomas G Black
*Assistant Examiner* — Ce Li
(74) *Attorney, Agent, or Firm* — Andrews Kurth Kenyon LLP

(57) ABSTRACT

An energy replenishment quantity control system 100 for controlling a replenishment quantity of each energy source in a moving body V which utilizes more than one kind of energy source, comprises a route searching part C10 configured to search a route to a destination, an energy cost calculating part C12 configured to calculate an energy cost of each energy source in using the respective energy sources based on information about the route searched by the route searching part C10, an energy replenishment quantity controlling part E14 configured to control the replenishment (Continued)

quantity of the energy sources based on the energy costs calculated by the energy cost calculating part C12.

8 Claims, 12 Drawing Sheets

(51) Int. Cl.
| | |
|---|---|
| *B60L 11/18* | (2006.01) |
| *B60L 15/20* | (2006.01) |
| *B60W 10/08* | (2006.01) |
| *B60W 10/26* | (2006.01) |
| *B60W 20/00* | (2016.01) |

(52) U.S. Cl.
CPC ....... *B60L 11/1809* (2013.01); *B60L 11/1838* (2013.01); *B60L 11/1851* (2013.01); *B60L 15/2045* (2013.01); *B60W 10/08* (2013.01); *B60W 10/26* (2013.01); *B60L 2240/62* (2013.01); *B60W 20/00* (2013.01); *B60W 2510/244* (2013.01); *B60W 2550/402* (2013.01); *Y02T 10/56* (2013.01); *Y02T 10/645* (2013.01); *Y02T 10/705* (2013.01); *Y02T 10/7005* (2013.01); *Y02T 10/7072* (2013.01); *Y02T 10/72* (2013.01); *Y02T 10/7283* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/169* (2013.01); *Y04S 30/14* (2013.01)

(58) Field of Classification Search
USPC .............. 701/22, 123; 340/995.27; 180/65.1, 180/65.21, 65.28, 65.285, 65.29, 65.31, 180/69.4
See application file for complete search history.

(56) References Cited

U.S. PATENT DOCUMENTS

| | | |
|---|---|---|
| 7,013,205 B1 | 3/2006 | Hafner et al. |
| 2003/0006914 A1* | 1/2003 | Todoriki et al. ............. 340/995 |
| 2004/0207350 A1 | 10/2004 | Wilton et al. |

FOREIGN PATENT DOCUMENTS

| | | | |
|---|---|---|---|
| JP | 06-51819 A | | 7/1994 |
| JP | 8-237810 A | | 9/1996 |
| JP | 8-265909 A | | 10/1996 |
| JP | 8-331772 A | | 12/1996 |
| JP | 10-170293 A | * | 6/1998 |
| JP | 2000-333305 A | | 11/2000 |
| JP | 3539497 B2 | | 4/2004 |
| JP | 3758140 B2 | | 1/2006 |

* cited by examiner

FIG.6

| ELECTRICITY CONSUMPTION RATE 10(%/km) |
| REACHABLE DISTANCE BY ELECTRICITY 10(km) |

|  | 1ST EXAMPLE | 2ND EXAMPLE | 3RD EXAMPLE | 4TH EXAMPLE | 5TH EXAMPLE |
| --- | --- | --- | --- | --- | --- |
| DESIRED DRIVING MODE | ECOLOGY | LOW-COST | ECOLOGY | LOW-COST | LOW-COST |
| REMAINING BATTERY LEVEL (%) | 20 | 20 | 20 | 0 | 0 |
| REMAINING GASOLINE LEVEL (liter) | 30 | 30 | 30 | 30 | 30 |
| FUEL EFFICIENCY (km/liter) | 10 | 10 | 10 | 10 | 10 |
| ELECTRICITY PRICE RATE (yen/10%) | 20 | 20 | 10 | 10 | 13 |
| GASOLINE PRICE RATE (yen/liter) | 130 | 130 | 130 | 130 | 130 |
| TOTAL DISTANCE OF THE ROUTE (km) | 10 | 30 | 30 | 30 | 30 |
| REGENERATION SECTION(S) (km) | 4 | 7 | 7 | 7 | 6 |
| TOTAL ELECTRIC QUANTITY REGENERATED (%) | 20 | 35 | 35 | 35 | 10 |

FIG.7
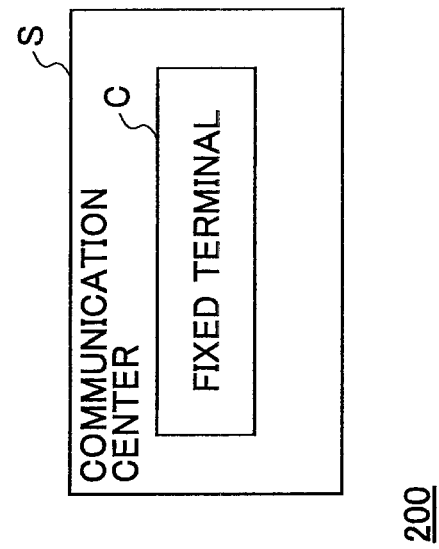
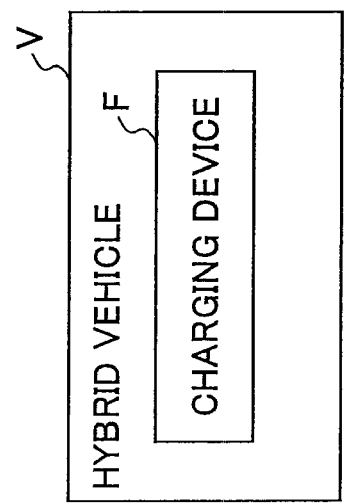

400

ENERGY REPLENISHMENT QUANTITY CONTROL SYSTEM

This is a 371 national phase application of PCT/JP2008/057281 filed 14 Apr. 2008, which claims priority to Japanese Patent Application No. 2007-114405 filed 24 Apr. 2007, the contents of which are incorporated herein by reference.

TECHNICAL FIELD

The present invention relates to an energy replenishment quantity control system for controlling a replenishment quantity of each energy source in a moving body which utilizes more than one kind of energy source, in particular, to an energy replenishment quantity control system for optimally controlling a replenishment quantity of each energy source depending on a driving policy such as ecology driving or low-cost driving.

BACKGROUND ART

Conventionally, a hybrid vehicle which efficiently uses electric energy stored in a battery so that the hybrid vehicle can use up the electric energy stored in the battery on arrival to a destination where it can charge the battery is known (see Patent Documents 1 and 2 for example).

Such hybrid vehicle controls consumption of the electric energy stored in the battery while determining distribution of outputs by an engine and an electric motor based on a distance to a destination and a remaining battery level, or while determining a target battery level at each location on a route based on information derived from a driving schedule set in advance such as a route, a travel distance, a position of a chargeable location, and an available time for charging at the chargeable location, and based on a remaining battery level.

A hybrid vehicle with an information presenting device which presents a reachable region where the hybrid vehicle can swing by before reaching its destination without replenishing energy on the way to the destination is known (see Patent Document 3 for example).

This hybrid vehicle derives the reachable region based on a remaining energy level and determines if it is necessary to replenish energy to reach the destination. Only if the hybrid vehicle determines that it is necessary to replenish energy, this hybrid vehicle presents a driver appropriate energy replenishing points in consideration of an energy replenishing cost in the case of utilizing each of the energy replenishing points.

[Patent Document 1] Japanese Patent Publication No. H08-265909
[Patent Document 2] Japanese Patent No. 3539497
[Patent Document 3] Japanese Patent No. 3758140

DISCLOSURE OF THE INVENTION

Problems to be Solved by the Invention

However, since hybrid vehicles described in Patent Documents 1 and 2 determine a target battery level at each chargeable location on a route based on the premise of a full charge at the chargeable locations without considering electricity cost and fuel cost, depending on a relationship between the electricity cost and the fuel cost, the difference of an energy cost between the case of utilizing electricity and the case of utilizing fuel can get high. Thus, the hybrid vehicles can be tricky to use for those (drivers) who prefer low-cost driving.

Similarly, since the hybrid vehicle described in Cited Document 3 does not consider an energy cost in the case that the hybrid vehicle can reach a destination without replenishing energy or cost of energy consumed on the route to an energy replenishing point, the hybrid vehicle can be tricky to use for those (drivers) who prefer low-cost driving.

In view of the above-mentioned points, it is an object of the present invention to provide an energy replenishment quantity control system for replenishing energy without excess and deficiency while considering an energy cost even if a driving policy such as ecology driving, low-cost driving, or the like is adopted.

Means for Solving Problems

To achieve the object above, an energy replenishment quantity control system according to a first embodiment of the invention is an energy replenishment quantity control system for controlling a replenishment quantity of each energy source in a moving body which utilizes more than one kind of energy source, including a route searching part configured to search a route to a destination, an energy cost calculating part configured to calculate an energy cost of each energy source in using the respective energy sources based on information about the route searched by the route searching part, an energy replenishment quantity controlling part configured to control the replenishment quantity of the energy sources based on the energy costs calculated by the energy cost calculating part.

According to a second embodiment of the invention, there is provided an energy replenishment quantity control system according to the first embodiment of the invention, wherein the energy cost calculating part calculates the energy cost based on price rate information of each energy source and the information about the route searched by the route searching part.

According to a third embodiment of the invention, there is provided an energy replenishment quantity control system according to the first or the second embodiment of the invention, wherein the energy cost calculating part calculates an energy cost based on using a plurality of energy sources on the route searched by the route searching part.

According to a fourth embodiment of the invention, there is provided an energy replenishment quantity control system according to one of the first to the third embodiments of the invention, wherein at least one of the more than one kind of energy source is configured to be regenerated through a movement of the moving body, the energy replenishment quantity control system further comprises a regeneration information calculating part configured to calculate information about the energy source to be regenerated on the route searched by the route searching part, and the energy cost calculating part calculates an energy cost of each energy source in using the respective energy sources based on the information about the route searched by the route searching part and the information about the energy source to be regenerated calculated by the regeneration information calculating part.

According to a fifth embodiment of the invention, there is provided an energy replenishment quantity control system according to the fourth embodiment of the invention, wherein the regeneration information calculating part calculates the information about the energy source to be regenerated on the route searched by the route searching part based on map information.

According to a sixth embodiment of the invention, there is provided an energy replenishment quantity control system according to one of the first to the fifth embodiments of the invention, wherein the more than one kind of energy source includes electricity and fuel.

Effect of the Invention

According to the means above, it is possible for the present invention to provide an energy replenishment quantity control system for replenishing energy without excess and deficiency while considering an energy cost even if a driving policy such as ecology driving, low-cost driving, or the like is adopted.

BRIEF DESCRIPTION OF THE DRAWINGS

FIG. 6 is a parameter table for calculating an energy cost and a recommended charging quantity.

FIG. 7 is a block diagram illustrating a second embodiment of an energy replenishment quantity control system.

EXPLANATION OF REFERENCE SIGNS

100, 200, 300 energy replenishment quantity control system
C fixed terminal
E-H charging device
Q in-car terminal
S communication center
V hybrid vehicle
C1, E1-H1, Q1 control unit
C2, E2-G2, Q2 communication unit
E3-H3 input unit
E4-H4 battery unit
C5, G5, H5 storage unit
F6, H6, Q6 vehicle information obtaining unit
E7-H7 display unit
E8-H8 charge control unit
F9, H9, Q9 drive source switching unit
C10, G10, H10 route searching part
C11, G11, H11 regeneration information calculating part
C12, G12, H12 energy cost calculating part
C13, G13, H13 recommended charging quantity calculating part E14-H14 charging quantity controlling part
F15, H15, Q15 drive assisting part

BEST MODE FOR CARRYING OUT THE INVENTION

With reference to the figures, a description of the best mode for carrying out the present invention is given below.

[First Embodiment]

Figure 1:
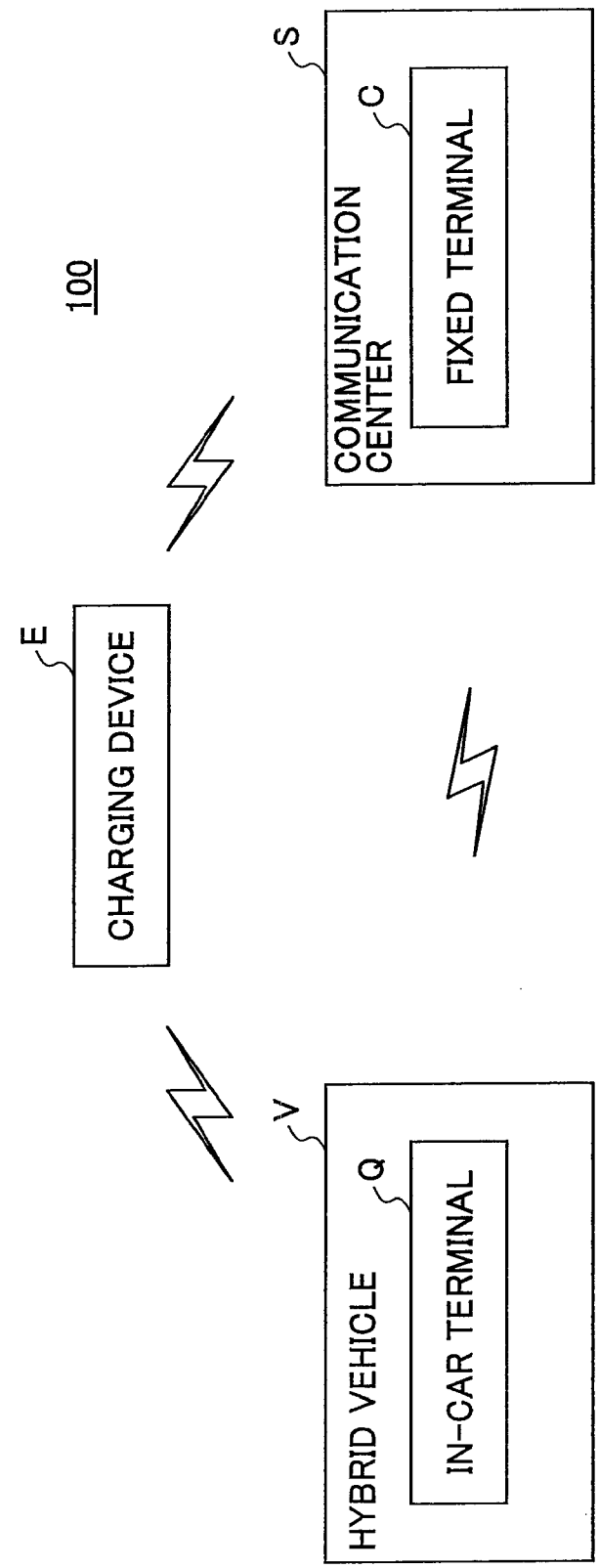
FIG. 1 is a block diagram illustrating a first embodiment of an energy replenishment quantity control system.

FIG. 1 is a block diagram illustrating an embodiment of an energy replenishment quantity control system according to the present invention. The energy replenishment quantity control system 100 includes a charging device E, a fixed terminal C installed in a communication center S, and an in-car terminal Q mounted on a hybrid vehicle V. The charging device E, the fixed terminal C, and the in-car terminal Q communicate information via a wireless communication.

The charging device E having a battery unit E4 is mounted on the hybrid vehicle V while the hybrid vehicle V is running, whereas the charging device E is detached from the vehicle together with the battery unit E4 in the case of charging the battery unit E4. The charging device E also communicates information with the in-car terminal Q via the wireless communication.

The charging device E can also charge the battery unit E4 while remaining mounted to the vehicle. In this case, the charging device E can communicate information with the in-car terminal Q via an in-car LAN such as a CAN (Controller Area Network), a LIN (Local Interconnect Network), or the like while remaining mounted on the vehicle.

Figure 2:
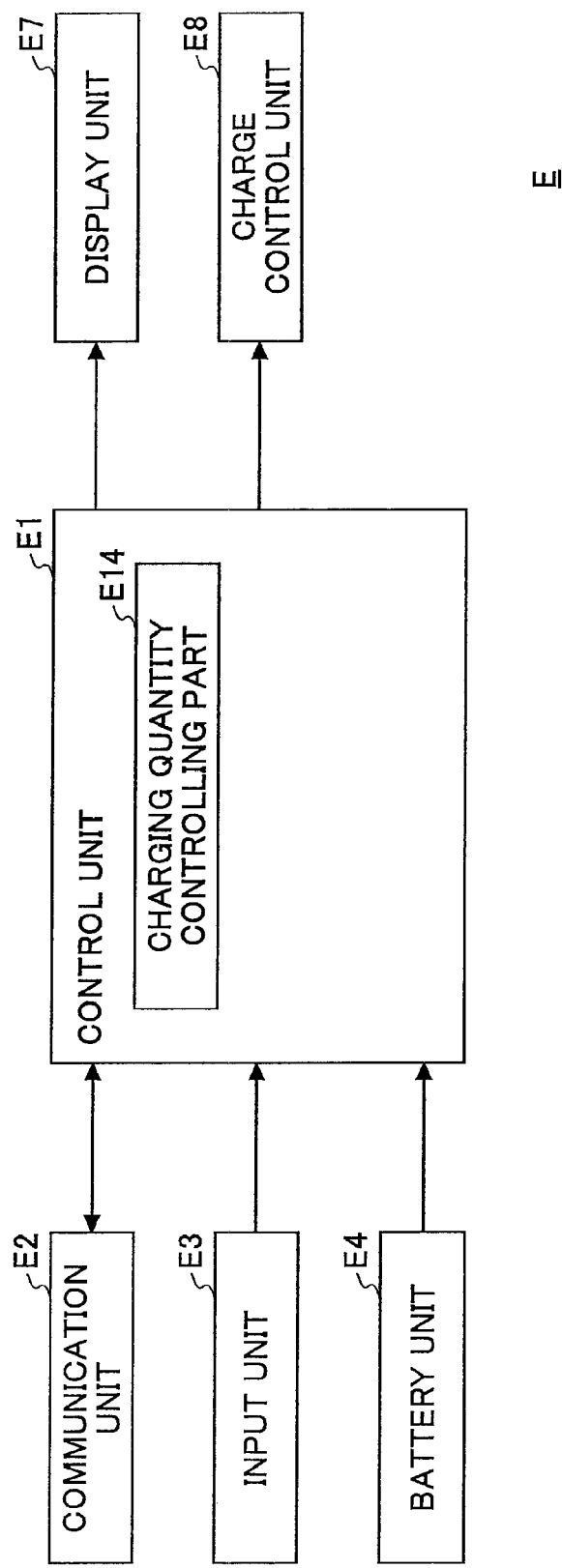
FIG. 2 is a block diagram illustrating a first embodiment of a charging device.

FIG. 2 is a block diagram illustrating an embodiment of the charging device E. The charging device E includes a control unit E1, a communication unit E2, an input unit E3, a battery unit E4, a display unit E7 and a charge control unit E8.

The control unit E1 is a computer which includes a CPU (Central Processing Unit), a RAM (Random Access Memory), a ROM (Read Only Memory), for example. For example, a program corresponding to a charging quantity controlling part E14 is stored in the ROM, and the CPU executes a process corresponding to the part.

The communication unit E2 controls communication between the in-car terminal Q mounted on the hybrid vehicle V or the fixed terminal C installed in the communication center S and the charging device E. For example, the communication unit E2 communicates information with the in-car terminal Q or the fixed terminal C by using frequencies allocated for a mobile phone or frequencies allocated for a specified low power wireless communication.

The input unit E3 inputs information into the charging device E. The input unit E3 may be, for example, a touch panel, a mouse, a keyboard, or the like.

The battery unit E4 actuates an electric motor for driving the hybrid vehicle V or a variety of electronic devices mounted on the hybrid vehicle V. The battery unit E4 may be, for example, a nickel-hydrogen rechargeable battery, lithium ion rechargeable battery, or the like.

The display unit E7 displays a variety of information. The display device E7 may be, for example, a LED (Light Emitting Diode) display, a plasma display, a liquid crystal display, an organic electro luminescent display, or the like.

The charge control unit E8 controls the charge of the battery unit E4. For example, the charge control unit E8 can initiate or terminate the charge of the battery unit E4 in response to a control signal from the control unit E1 or control a charging voltage.

The charge control unit E8 charges the battery unit E4 until a remaining battery level reaches a predetermined level while monitoring the remaining battery level of the battery unit E4. The charge control unit E8 utilizes a commercial power source to charge the battery unit E4.

The charging quantity controlling part E14 controls the charge control unit E8. For example, the charging quantity controlling part E14 obtains a recommended charging quantity (which, as described hereinafter, represents necessary and sufficient electric quantity to be charged at a chargeable location (for example, a domicile, a place of work, or the like)) calculated by the fixed terminal C via the communication unit E2. Then, the charging quantity controlling part E14 sends a control signal including information about the recommended charging quantity to the charge control unit E8.

The charging quantity controlling part E14 can also determine a charging voltage, a charging time, a charging start time, a charging end time, or the like based on the obtained recommended charging quantity, and actuate the charge controlling unit E8 through the control signal according to the determination.

Figure 3:
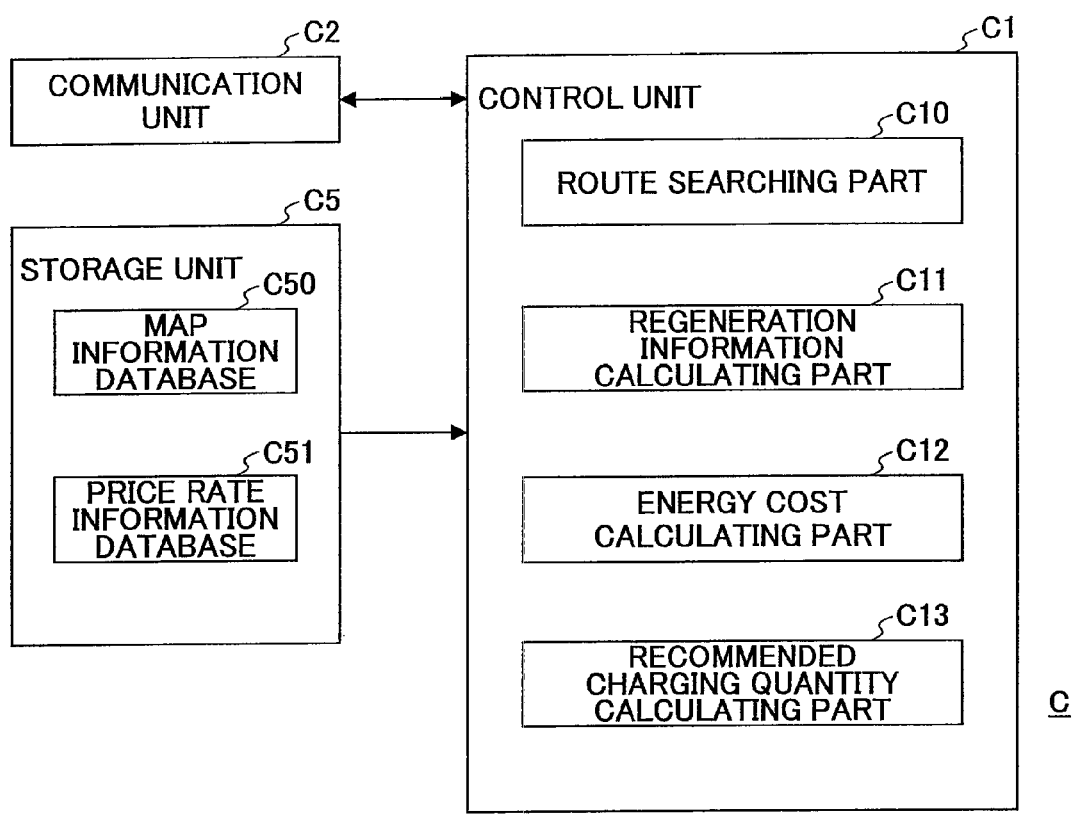
FIG. 3 is a block diagram illustrating an embodiment of a communication center.

FIG. 3 is a block diagram illustrating an embodiment of the fixed terminal C. The fixed terminal C includes a control unit C1, a communication unit C2, and a storage unit C5.

The control unit C1 is a computer which includes a CPU, a RAM, a ROM, for example. For example, programs corresponding respectively to a route searching part C10, a regeneration information calculating part C11, an energy cost calculating part C12, and a recommended charging quantity calculating part C13 are stored in the ROM, and the CPU executes a process corresponding to each part.

Similar to the communication unit E2, the communication unit C2 controls communication with the in-car terminal Q mounted on the hybrid vehicle V, or the charging device E.

The storage unit C5 stores a variety of information required for the fixed terminal C. For example, the storage unit C5 may be a nonvolatile storage medium such as a hard disk, a DVD (Digital Versatile Disk), or the like. The storage unit C5 stores a map information database C50 and a price rate information database C51.

The map information database C50 is a database which searchably and systematically stores data which the route searching part C10 utilizes for searching a route. The data may include, for example, tolls for turnpikes, names of places, addresses, phone numbers, positional information (latitude, longitude, altitude) of nodes (bifurcations, junctions, interchanges, or the like), link lengths or link costs of links which connect nodes, or the like.

The price rate information database C51 is a database which searchably and systematically stores price rate data. The data may include, for example, an electricity price rate which differs according to supplier, region, or time zone, a fuel price rate which differs according to a supply equipment (a gas station for example) or species (ethanol, gasoline, light diesel oil, LPG (Liquefied Petroleum Gas), hydrogen, or the like), or the like. It will be assumed that the fixed terminal C updates the map information database C50 and the price rate information database C51 periodically.

Next is an explanation of each part in the control unit C1.

The route searching part C10 derives an optimal route from a departure point to a destination based on positional information (latitude, longitude, altitude) of the departure point, positional information (latitude, longitude, altitude) of the destination, and the map information database C50. For example, the route searching part C10 searches the shortest route by using the Dijkstra method as a shortest route search algorithm. The route searching part C10 may search the fastest route to reach the destination, a route to avoid using a turnpike, or the like, other than the shortest route.

The regeneration information calculating part C11 calculates regeneration information. For example, the regeneration information calculating part C11 calculates regeneration information based on the information about the route searched by the route searching part C10 (for example, a total distance of the route, a vertical interval of the route, a stop sign location, or the like, and hereinafter called a "route information").

"Regeneration information" represents information about regeneration energy, including a position to initiate collecting regeneration energy, a position to terminate collecting regeneration energy, a length of a section for collecting regeneration energy, an amount of regeneration energy collected at each regeneration section, total amount of regeneration energy, or the like.

The regeneration energy is collected while the hybrid vehicle V decelerates or while the hybrid vehicle V coasts along a downward slope. The amount of the regeneration energy to be collected at each regeneration section is calculated based on a legal speed (km/h) of the road on which the hybrid vehicle is supposed to run, the legal speed being obtained through map information, a height difference between a start point and an end point of the downward slope, or the like. The amount of the regeneration energy collected at each regeneration section may be calculated on an average velocity (km/h) or a maximum velocity (km/h) of the hybrid vehicle V based on past data obtained through a variety of sensors mounted on the hybrid vehicle V, or the like (a deceleration time (sec.), a deceleration (km/h/sec.), a length of a deceleration section (km), or the like are calculated from the average velocity (km/h) and the maximum velocity (km/h)).

The energy cost calculating part C12 calculates an energy cost. For example, the energy cost calculating part C12 calculates an energy cost based on a total distance (km) of a route searched by the route searching part C10, a length (km) of (a) regeneration section(s) and a regenerated electric quantity (%) calculated by the regeneration information calculating part C11 (hereinafter, an electric quantity is represented by a ratio of a remaining battery level to a full charge state of the battery unit E4 as 100 percent), an electricity price rate (yen/%) (represented by expenses for charging 1 percent of the electric quantity) and a gasoline price rate (yen/liter) (represented by expenses for 1 liter of gasoline) stored in the price rate information database C51, and based on an electricity consumption rate (%/km) (represented by an electric quantity required to travel 1 kilometer) and a gasoline consumption rate (liter/km) (represented by an amount of gasoline required to travel 1 kilometer) of the hybrid vehicle V, and the like.

The energy cost calculating part C12 also calculates energy costs in a plurality of driving modes such as an energy cost in the case of adopting a type of driving which consumes only electricity if at all possible including charging the battery unit E4 (hereinafter called "the electricity-oriented driving"), an energy cost in the case of adopting a type of driving which consumes only fuel if at all possible including replenishing fuel (hereinafter called "the fuel-oriented driving"), an energy cost in the case of adopting a type of driving which consumes existing electricity (including electricity regenerated while driving) stored in the battery unit E4 preferentially (hereinafter called "the electricity-priority driving"), an energy cost in the case of adopting a type of driving which consumes existing fuel stored in a fuel tank preferentially (hereinafter called "the fuel-priority driving"), or the like.

The energy cost calculating part C12 calculates positional information (latitude, longitude, altitude) of (a) switching point(s) where the energy cost calculating part C12 switches between an electricity driving and a fuel driving in order to minimize an energy cost in each driving mode (hereinafter called "the drive source switching point(s)").

The regeneration information calculating part C11 and the energy cost calculating part C12 may calculate each of regeneration information and an energy cost in consideration of parameters such as a legal speed or a probability of a congestion of each road which constitutes a route searched by the route searching part C10, an average fuel efficiency or an average velocity of each driver based on past data, or the like. This is because the regeneration information and the energy cost are affected by these parameters.

The recommended charging quantity calculating part C13 calculates a necessary and sufficient electric quantity to be charged at a chargeable location (for example, a domicile, a place of work, or the like) (hereinafter called "recommended charging quantity"). For example, the recommended charging quantity calculating part C13 calculates as recommended charging quantity a difference (gap) between the present remaining battery level of the battery unit E4 and the remaining battery level required to achieve each of driving modes such as the electricity-oriented driving, the fuel-oriented driving, the electricity-priority driving, the fuel-priority driving, or the like.

In the example, in order to achieve ecology driving (which is driving for reducing a $CO_2$ emission and corresponds to the electricity-oriented driving), the recommended charging quantity calculating part C13 calculates a necessary and sufficient recommended charging quantity for driving which minimizes the gasoline consumption (liter), that is, maximizes the electricity consumption, based on a total distance (km) of a route searched by the route searching part C10, a length (km) of (a) regeneration section(s) and regenerated electric quantity (%) calculated by the regeneration information calculating part C11, and an electricity consumption rate (%/km) of the hybrid vehicle V.

Similarly, in order to achieve low-cost driving (which is driving for reducing energy cost), the recommended charging quantity calculating part C13 can calculate a necessary and sufficient recommended charging quantity for driving which minimizes the energy cost based on the positional information of the drive source switching point(s) on a route searched by the route searching part C10 (from which travel distances by the electricity driving and by the fuel driving are derived), the electricity price rate (yen/%), the fuel price rate (yen/liter), or the like.

Figure 4:
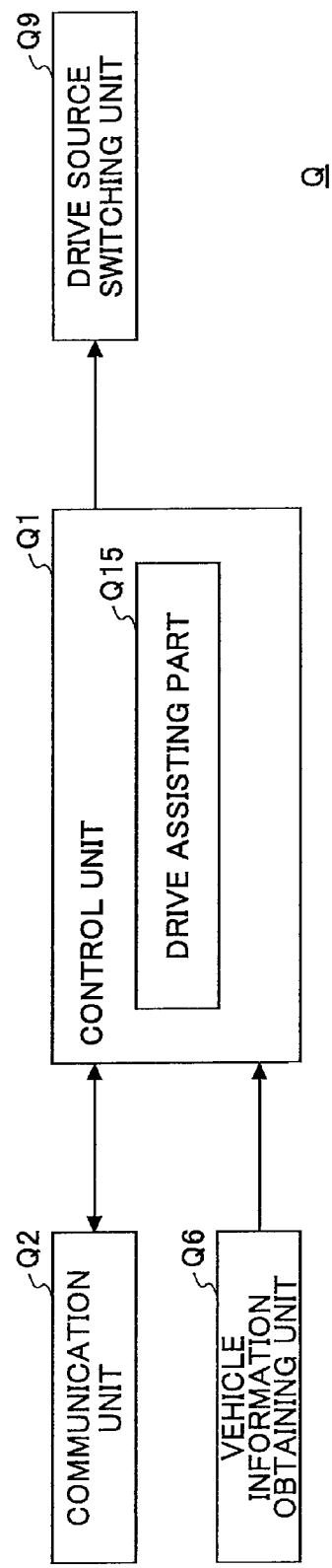
FIG. 4 is a block diagram illustrating an embodiment of an in-car terminal.

FIG. 4 is a block diagram illustrating an embodiment of the in-car terminal Q. The in-car terminal Q includes a control unit Q1, a communication unit Q2, a vehicle information obtaining unit Q6 and a drive source switching unit Q9.

Similar to the control unit E1 and the control unit C1, the control unit Q1 is a computer which includes a CPU, a RAM, a ROM, for example. For example, a programs corresponding to a drive assisting part Q15 is stored in the ROM, and the CPU executes a process corresponding to the part.

Similar to the communication unit E2 and the communication unit C2, the communication unit Q2 controls the communication with the fixed terminal C installed in the communication center S, or the charging device E.

The vehicle information obtaining unit Q6 obtains vehicle information of the hybrid vehicle V. For example, the vehicle information obtaining unit Q6 collects information from a variety of sensors mounted on the hybrid vehicle V such as a GPS (Global Positioning System), fuel sensor, odometer, or the like and then obtains vehicle information.

"Vehicle information" represents information about the hybrid vehicle V used for calculating regeneration information, an energy cost, and a recommended charging quantity. For example, vehicle information includes the position of a vehicle, a remaining fuel level, an average fuel efficiency, an average velocity, or the like.

The drive source switching unit Q9 switches drive sources of the hybrid vehicle V. For example, in response to a control signal from the control unit Q1, the drive source switching unit Q9 switches drive sources from an electric motor to an internal combustion engine, or conversely, from an internal combustion engine to an electric motor.

The drive assisting part Q15 assists driving of the hybrid vehicle V. For example, the drive assisting part Q15 performs a route guide based on route information obtained from the communication center S via the communication unit Q2, or outputs a control signal to the drive source switching unit Q9 based on information about the drive source switching point(s) obtained from the communication center S via the communication unit Q2 so that the drive source switching unit Q9 can switch drive sources automatically.

Figure 5:
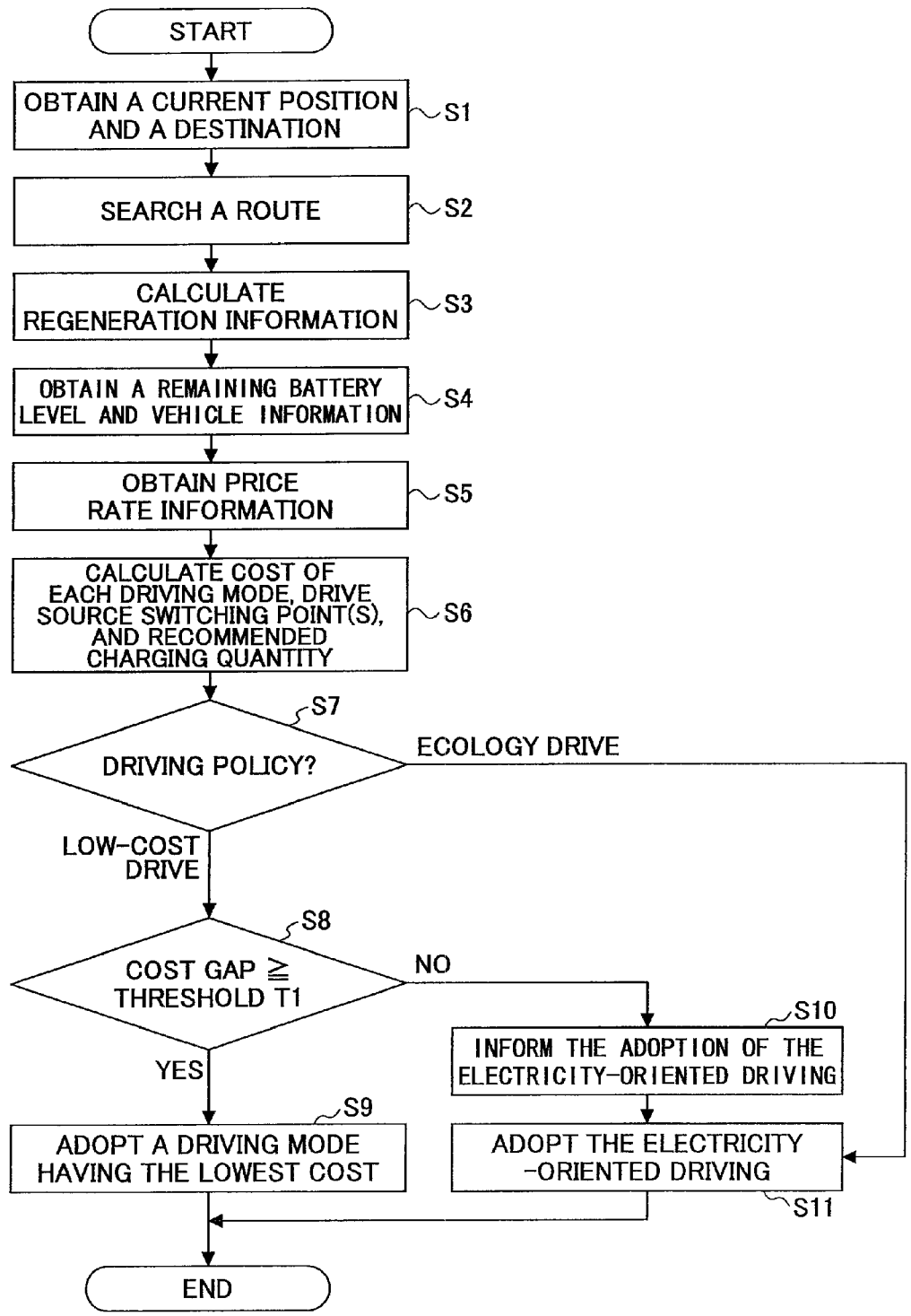
FIG. 5 is a flowchart illustrating a process for determining a driving mode.

Next, with reference to FIG. 5, the process by which the energy replenishment quantity control system 100 determines a driving mode to be adopted (hereinafter called "the driving mode determining process") is explained. FIG. 5 is a flowchart illustrating the flow of the driving mode determining process.

First, in response to a request from the charging device E, the fixed terminal C of the energy replenishment quantity control system 100 sends map information of the map information database C50 stored in the storage unit C5 via the communication unit C2 and the communication unit E2 of the charging device E to the charging device E. Then, the fixed terminal C invites an operator to input a destination by displaying electronic map data on the display unit E7 of the charging device E and obtains information about a current position of the hybrid vehicle V and a destination to which the hybrid vehicle V is headed for next (Step S1).

Then, the fixed terminal C performs a route search by the route searching part C10 based on the information about the current position of the hybrid vehicle V and the destination (Step S2).

In this case, the fixed terminal C makes the charging device E display on the display unit E7 a plurality of routes searched by the route searching part C10 via the communication unit C2 and the communication unit E2 of the charging device E, and invites the operator to select one of the routes. Alternatively, the control unit C1 may select one of the routes automatically and invite the operator to confirm by displaying the selected route on the display unit E7.

The charging device E may display the routes searched by the route searching part C10 distinguishably from other map information (other roads) and invite the operator to select one of the routes by letting the operator see those routes on the map. Alternatively, the charging device E may display on the display unit E7 software buttons on which textual information such as a main drive-by on the respective routes searched by the route searching part C10 are shown, and invite the operator to select one of the routes.

Then, the fixed terminal C calculates the regeneration information by the regeneration information calculating part C11 based on the route information of the selected route (Step S3).

Then, the fixed terminal C obtains the remaining battery level and the vehicle information from the charging device E via the wireless communication in order to calculate respective energy costs corresponding to the variety of driving modes, the drive source switching point(s), and the recommended charging quantity (Step S4), and obtains price rate information from the price rate information database C51 stored in the storage unit C5 (Step S5).

The charging device E can obtain the vehicle information from the in-car terminal Q via the in-car LAN before being detached from the in-car terminal Q for charging at a domicile or a place of work, or can obtain the vehicle information from the in-car terminal Q via the wireless communication after being detached from the in-car terminal Q.

Then, by using the energy cost calculating part C12, the fixed terminal C calculates respective energy costs corresponding to a variety of driving modes and the drive source switching point(s) based on the route information of the route searched by the route searching part C10 and selected by the operator, the regeneration information calculated by the regeneration information calculating part C11, the price rate information obtained from the price rate information database C51, and the remaining battery level and the vehicle information obtained via the communication unit C2. Then, the fixed terminal C calculates a recommended charging quantity by the recommended charging quantity calculating part C13 (Step S6).

Then, the fixed terminal C displays on the display unit E7 of the charging device E via the wireless communication a screen for inviting the operator to select a driving policy, and determines which driving policy has been selected after receiving an input by the operator through the input unit E3 of the charging device E via the wireless communication (Step S7).

For example, in order to invite the operator to select the driving policy, the fixed terminal C displays on the display unit E7 software buttons each representing options such as "low-cost driving", "ecology driving", or the like, and invites the operator to select one of the software buttons via a touch panel. In this way, the fixed terminal C invites the operator to select a driving policy.

The fixed terminal C displays a screen for inviting the operator to select a driving policy after calculating the energy cost, the drive source switching point(s), the recommended charging quantity, and the like, in order to allow the operator to select the driving policy while showing the information about the energy cost, the drive source switching point(s), the recommended charging quantity, and the like. However, the fixed terminal C may display the screen for inviting the operator to select the driving policy before calculating the energy cost, the drive source switching point(s), the recommended charging quantity, and the like. This is because the fixed terminal C can omit the calculation of the energy cost in the case that the ecology driving is selected.

If the fixed terminal C determines that the low-cost driving has been selected ("low-cost driving" in Step S7), the fixed terminal C determines whether a cost gap between the energy cost of the driving mode which has the lowest energy cost and the energy cost in the case that the electricity-oriented driving is adopted is greater than or equal to a threshold value T1 (Step S8).

If the fixed terminal C determines that the cost gap is greater than or equal to the threshold value T1 ("YES" in Step S8), the fixed terminal C adopts the driving mode having the lowest energy cost (Step S9), and terminates the driving mode determining process.

If the fixed terminal C determines that the cost gap is less than the threshold value T1 ("NO" in Step S8), the fixed terminal C displays on the display unit E7 of the charging device E a message informing the operator that the electricity-oriented driving will be adopted due to the small cost gap (Step S10).

This is to encourage more people to adopt the ecology driving. In addition, it is easier to encourage the operator who had not yet adopted the ecology driving to adopt the ecology driving if the cost gap between the energy cost of the driving mode which has the lowest energy cost and the energy cost in the case that the electricity-oriented driving is adopted is small.

On the other hand, the fixed terminal C may also allow the operator to reject the adoption of the ecology driving. In such a case, if the adoption of the ecology driving is rejected by the operator, the fixed terminal C adopts the driving mode which has the lowest energy cost.

Then, the fixed terminal C would adopt the ecology driving (the electricity-oriented driving) (Step S11), and terminates the driving mode determining process.

If the fixed terminal C determines that the ecology driving has been selected in Step S7 ("ecology driving" in Step S7), the fixed terminal C adopts the ecology driving (the electricity-oriented driving) (Step S11), and terminates the driving mode determining process.

Then, the fixed terminal C sends the recommended charging quantity calculated by the recommended charging quantity calculating part C13 to the charging quantity controlling part E14 of the charging device E, and causes the charging device E to initiate a charging of the battery unit E4.

In response to a request from the in-car terminal Q, the fixed terminal C sends the route information of the route searched by the route searching part C10 and selected by the operator and the information about the drive source switching point(s) calculated by the energy cost calculating part C12 to the drive assisting part Q15 of the in-car terminal Q, causes the in-car terminal Q to perform a route guide in accordance with the route information, and causes the drive source switching part Q9 to switch drive sources in accordance with the information about the drive source switching point(s).

Next, with reference to five examples in FIG. 6, the process flow by which the energy replenishment quantity control system 100 adopts an optimal driving mode by calculating energy costs and a recommended charging quantity is explained. FIG. 6 is a parameter table for calculating energy costs and a recommended charging quantity. FIG. 6 indicates that, in common to five examples, a reachable distance by electricity of the battery unit E4 in full charge state is 10 (km), that is, an electricity consumption rate is 10(%/km).

[First Example]

The first example in FIG. 6 corresponds to the case where an operator desires the ecology driving. The first example indicates that the remaining battery level is 20(%), the remaining gasoline level is 30 (liter), the fuel efficiency is 10 (km/liter), the electricity price rate is 20 (yen/10%) (the electricity price rate is expressed by a price rate required for charging 10(%) of the battery unit E4), the gasoline price rate is 130 (yen/liter), the total distance of the route selected by the operator is 10 (km), the total distance of the regeneration section(s) is 4 (km), and the total electric quantity regenerated at the regeneration section(s) is 20(%).

In this case, the fixed terminal C calculates the electric quantity 60(%) (6×10=60) required for driving the hybrid vehicle V by electricity at section(s) other than the regeneration section(s), based on the distance 6 (km) calculated by subtracting the total distance 4 (km) of the regeneration section(s) from the total distance 10 (km) of the route and the electricity consumption rate 10 (%/km).

The fixed terminal C calculates the recommended charging quantity 20(%) (60−(20+20)=20) required for driving the hybrid vehicle V by electricity at section(s) other than the regeneration section(s), based on the electric quantity 60(%) required for driving the hybrid vehicle V by electricity at section(s) other than the regeneration section(s), the total electric quantity 20(%) regenerated at the regeneration section(s), and the remaining battery level 20(%).

The fixed terminal C calculates the electricity cost 40 (yen) based on the recommended charging quantity 20(%) and the electricity price rate 20 (yen/10%).

In this way, the first example indicates that it is possible to drive the hybrid vehicle V to the destination by only electricity at the electricity cost of 40 (yen), if the remaining battery level of the battery unit E4 of the charging device E is charged from 20(%) to 40(%).

Also, the fixed terminal C also calculates the gasoline quantity 0.2 (liter) ((6−(20+20)÷10)÷10=0.2) required for driving the hybrid vehicle V by the electricity-priority driving at section(s) other than the regeneration section(s), based on the distance 6 (km) calculated by subtracting the total distance 4 (km) of the regeneration section(s) from the total distance 10 (km) of the route, the remaining battery level 20(%), the total electric quantity 20(%) regenerated at the regeneration section(s), the electricity consumption rate 10(%/km), and the fuel efficiency 10 (km/liter). Then, the fixed terminal C calculates the gasoline cost 26 (yen) based on the gasoline quantity 0.2 (liter) and the gasoline price rate 130 (yen/liter).

In this way, in addition to the aforementioned possible driving to the destination, the first example indicates that it is possible to drive the hybrid vehicle V to the destination by electrically driving the hybrid vehicle V 4 (km) by using electricity of the remaining battery level 20(%) and the total electric quantity 20(%) regenerated at the regeneration section(s) without charging the battery unit E4 (i.e. the electricity cost becomes zero), and by driving the hybrid vehicle V 2 (km) by burning 0.2 (liter) of gasoline at the gasoline cost of 26 (yen).

The fixed terminal C displays on the display unit E7 of the charging device E both the energy cost 40 (yen) in the case of adopting the ecology driving (the electricity-oriented driving) and the energy cost 26 (yen) in the case of adopting the low-cost driving (the electricity-priority driving) so that the operator can select one of the driving modes.

If the fixed terminal C detects that the operator has selected the ecology driving via the input unit E3 of the charging device E (in this case, the operator wants the ecology driving to be adopted even if the cost becomes somewhat high), the fixed terminal C adopts the ecology driving, sends the value of the recommended charging quantity 20(%) to the charging quantity controlling part E14 of the charging device E so that the charging quantity controlling part E14 can start charging the battery unit E4 with the commercial power source.

In a case such as this, where the cost gap is only 14 (yen), the fixed terminal C starts charging the battery unit E4 without alerting the operator that charging will take place.

However, the fixed terminal C may start charging the battery unit E4 after alerting the operator and obtaining confirmation.

Then, the fixed terminal C sends information about the drive source switching point(s) to the drive assisting part Q15 of the in-car terminal Q, and drives the hybrid vehicle V to the destination while causing the drive assisting part Q15 to switch drive sources in accordance with the information about the drive source switching point(s) automatically.

[Second Example]

The second example in FIG. 6 corresponds to the case where an operator desires low-cost driving. The second example is different from the first example in respect that the total distance of the route selected by the operator is 30 (km), the total distance of the regeneration section(s) is 7 (km), and the total electric quantity regenerated at the regeneration section(s) is 35(%).

In this case, the fixed terminal C calculates the electric quantity 230(%) (23×10=230) required for driving the hybrid vehicle V by electricity at section(s) other than the regeneration section(s), based on the distance 23 (km) calculated by subtracting the total distance 7 (km) of the regeneration section(s) from the total distance 30 (km) of the route and the electricity consumption rate 10(%/km).

The fixed terminal C calculates the recommended charging quantity 175(%) (230−(35+20)=175) required for driving the hybrid vehicle V by electricity at section(s) other than the regeneration section(s), based on the electric quantity 230(%) required for driving the hybrid vehicle V by electricity at section(s) other than the regeneration section(s), the total electric quantity 35(%) regenerated at the regeneration section(s), and the remaining battery level 20(%).

Since the remaining battery level is 20(%), the maximum value of the recommended charging quantity becomes 80(%) (The battery unit E4 can not be charged beyond 100 percent). Thus, the maximum distance which the battery unit E4 can drive the hybrid vehicle V by electricity is, including consideration of the total electric quantity 35(%) regenerated at the regeneration section(s), 13.5 (Ian) which corresponds to the electric quantity of 135(%).

The fixed terminal C calculates the electricity cost 160 (yen) based on the recommended charging quantity 80(%) and the electricity price rate 20 (yen/10%), calculates the gasoline cost 123.5 (yen) based on the distance 9.5 (km) which the hybrid vehicle V drives by fuel at section(s) other than the regeneration section(s), the fuel efficiency 10 (km/liter), and the gasoline price rate 130 (yen/liter), and then calculates the energy cost 283.5 (yen).

In this way, the second example indicates that it is possible to drive the hybrid vehicle V to the destination by electrically driving the hybrid vehicle V 13.5 (km) after charging the battery unit E4 of the charging device E from the remaining battery level 20(%) to 100(%) at the electricity cost of 160 (yen), and by driving the hybrid vehicle V 9.5 (km) by burning 0.95 (liter) of gasoline at the gasoline cost of 123.5 (yen).

Also, the fixed terminal C also calculates the gasoline quantity 1.75 (liter) ((23−(20+35)÷10)÷10=1.75) required for driving the hybrid vehicle V by the electricity-priority driving at section(s) other than the regeneration section(s), based on the distance 23 (km) calculated by subtracting the total distance 7 (km) of the regeneration section(s) from the total distance 30 (km) of the route, the remaining battery level 20(%), the total electric quantity 35(%) regenerated at the regeneration section(s), the electricity consumption rate 10(%/km), and the fuel efficiency 10 (km/liter). Then, the fixed terminal C calculates the gasoline cost 227.5 (yen) based on the gasoline quantity 1.75 (liter) and the gasoline price rate 130 (yen/liter).

In this way, in addition to the aforementioned possible driving to the destination, the second example indicates that it is possible to drive the hybrid vehicle V to the destination by electrically driving the hybrid vehicle V 5.5 (km) by using electricity of the remaining battery level 20(%) and the total electric quantity 35(%) regenerated at the regeneration section(s) without charging the battery unit E4 (i.e. the electricity cost becomes zero), and by driving the hybrid vehicle V 17.5 (km) by burning 1.75 (liter) of gasoline at the gasoline cost of 227.5 (yen).

The fixed terminal C displays on the display unit E7 of the charging device E both the energy cost 283.5 (yen) in the case of adopting the ecology driving (the electricity-oriented driving) and the energy cost 227.5 (yen) in the case of adopting the low-cost driving (the electricity-priority driving) so that the operator can select one of the driving modes.

If the fixed terminal C detects that the operator has selected the low-cost driving via the input unit E3 of the charging device E (in this case, the operator wants the low-cost driving to be adopted if the cost gap between the ecology driving and the low-cost driving is large), the fixed terminal C adopts the low-cost driving, sends the value of the recommended charging quantity (in this case, zero) to the charging quantity controlling part E14 of the charging device E so that the charging quantity controlling part E14 does not start charging the battery unit E4 with the commercial power source.

Then, the fixed terminal C sends information about the drive source switching point(s) to the drive assisting part Q15 of the in-car terminal Q, and drives the hybrid vehicle V to the destination while causing the drive assisting part Q15 to switch drive sources in accordance with the information about the drive source switching point(s) automatically.

[Third Example]

The third example in FIG. 6 corresponds to the case where an operator desires the ecology driving. The third example is different from the second example in respect that the electricity price rate is 10 (yen/10%).

The fixed terminal C calculates the electricity cost 80 (yen) based on the recommended charging quantity 80(%) and the electricity price rate 10 (yen/10%), and then calculates the energy cost 203.5 (yen) by adding the gasoline cost 123.5 (yen) to it.

In this way, the third example indicates that it is possible to drive the hybrid vehicle V to the destination by electrically driving the hybrid vehicle V 13.5 (km) after charging the battery unit E4 of the charging device E from the remaining battery level 20(%) to 100(%) at the electricity cost of 80 (yen), and by driving the hybrid vehicle V 9.5 (km) by burning 0.95 (liter) of gasoline at the gasoline cost of 123.5 (yen).

The fixed terminal C displays on the display unit E7 of the charging device E both the energy cost 203.5 (yen) in the case of adopting the ecology driving (the electricity-oriented driving) and the energy cost 227.5 (yen) in the case of adopting the low-cost driving (the driving mode whose energy cost is the lowest among driving modes other than the electricity-oriented driving, in this case, the electricity-priority driving) so that the operator can select one of the driving modes.

If the fixed terminal C detects that the operator has selected the ecology driving via the input unit E3 of the charging device E (in this case, the operator wants the ecology driving to be adopted even if the cost gap between the ecology driving and the low-cost driving is large), the fixed terminal C sends the value of the recommended charging quantity 80(%) to the charging quantity controlling part E14 of the charging device E so that the charging quantity controlling part E14 can start charging the battery unit E4 with the commercial power source.

In a case such as this, where the energy cost of the ecology driving selected by the operator is the lowest in the first place, the fixed terminal C adopts the ecology driving without alerting the operator that charging will take place and then starts charging the battery unit E4.

[Fourth Example]

The fourth example in FIG. 6 corresponds to the case where an operator desires the low-cost driving. The fourth example is different from the third example in respect that the remaining battery level is 0(%).

The fixed terminal C calculates the recommended charging quantity 195(%) (230−(35+0)=195) required for driving the hybrid vehicle V by electricity at section(s) other than the regeneration section(s), based on the electric quantity 230(%) required for driving the hybrid vehicle V by electricity at section(s) other than the regeneration section(s), the total electric quantity 35(%) regenerated at the regeneration section(s), and the remaining battery level 0(%).

Since the remaining battery level is 0(%), the maximum value of the recommended charging quantity becomes 100 (%). Thus, the maximum distance which the battery unit E4 can drive the hybrid vehicle V by electricity is, including consideration of the total electric quantity 35(%) regenerated at the regeneration section(s), 13.5 (km) which corresponds to the electric quantity of 135(%).

The fixed terminal C calculates the electricity cost 100 (yen) based on the recommended charging quantity 100(%) and the electricity price rate 10 (yen/10%), calculates the gasoline cost 123.5 (yen) based on the distance 9.5 (km) which the hybrid vehicle V drives by fuel at section(s) other than the regeneration section(s) and the fuel efficiency 10 (km/liter), and then calculates the energy cost 223.5 (yen).

Also, the fixed terminal C also calculates the gasoline quantity 1.95 (liter) ((23−(0+35)÷10)÷10=1.95) required for driving the hybrid vehicle V by the electricity-priority driving at section(s) other than the regeneration section(s), based on the distance 23 (km) calculated by subtracting the total distance 7 (km) of the regeneration section(s) from the total distance 30 (km) of the route, the remaining battery level 0(%), the total electric quantity 35(%) regenerated at the regeneration section(s), the electricity consumption rate 10(%/km), and the fuel efficiency 10 (km/liter). Then, the fixed terminal C calculates the energy cost 253.5 (yen) based on the gasoline quantity 1.95 (liter) and the gasoline price rate 130 (yen/liter).

In this way, the fourth example indicates that it is possible to drive the hybrid vehicle V to the destination by electrically driving the hybrid vehicle V 3.5 (km) by using electricity of the remaining battery level 0(%) and the total electric quantity 35(%) regenerated at the regeneration section(s) without charging the battery unit E4 (i.e. the electricity cost becomes zero), and by driving the hybrid vehicle V 19.5 (km) by burning 1.95 (liter) of gasoline at the gasoline cost of 253.5 (yen).

The fixed terminal C displays on the display unit E7 of the charging device E both the energy cost 223.5 (yen) in the case of adopting the ecology driving (the electricity-oriented driving) and the energy cost 253.5 (yen) in the case of adopting the low-cost driving (the driving mode whose energy cost is the lowest among driving modes other than the electricity-oriented driving, in this case, the electricity-priority driving) so that the operator can select one of the driving modes.

If the fixed terminal C detects that the operator has selected the low-cost driving via the input unit E3 of the charging device E (in this case, the operator wants the low-cost driving to be adopted if the cost gap between the ecology driving and the low-cost driving is large), the fixed terminal C sends the value of the recommended charging quantity 100(%) to the charging quantity controlling part E14 of the charging device E so that the charging quantity controlling part E14 can start charging the battery unit E4 with the commercial power source.

In this case, although the operator has selected not the ecology driving but the low-cost driving, since the energy cost of the ecology driving is the lowest in the first place, the fixed terminal C adopts the ecology driving without alerting the operator that the ecology driving will be adopted, and then starts charging the battery unit E4.

[Fifth Example]

The fifth example in FIG. 6 is different from the fourth example in respect that the electricity price rate is 13 (yen/10%), the total distance of the regeneration section(s) is 6 (km), and the total electric quantity regenerated at the regeneration section(s) is 10(%).

In this case, the fixed terminal C calculates electric quantity 240(%) (24×10=240) required for driving the hybrid vehicle V by electricity at section(s) other than the regeneration section(s), based on the distance 24 (km) calculated by subtracting the total distance 6 (km) of the regeneration section(s) from the total distance 30 (km) of the route and the electricity consumption rate 10(%/km).

The fixed terminal C calculates the recommended charging quantity 230(%) (240−(10+0)=230) required for driving the hybrid vehicle V by electricity at section(s) other than the regeneration section(s), based on the electric quantity 240(%) required for driving the hybrid vehicle V by electricity at section(s) other than the regeneration section(s), the total electric quantity 10(%) regenerated at the regeneration section(s), and the remaining battery level 0(%).

Since the remaining battery level is 0(%), the maximum value of the recommended charging quantity becomes 100 (%). Thus, the maximum distance which the battery unit E4 can drive the hybrid vehicle V by electricity is, including consideration of the total electric quantity 10(%) regenerated at the regeneration section(s), 11 (km) which corresponds to the electric quantity of 110(%).

The fixed terminal C calculates the electricity cost 130 (yen) based on the recommended charging quantity 100(%) and the electricity price rate 13 (yen/10%), calculates the gasoline cost 169 (yen) based on the distance 13 (km) which the hybrid vehicle V drives by fuel at section(s) other than the regeneration section(s), the fuel efficiency 10 (km/liter), and gasoline price rate 130 (yen/liter), and then calculates the energy cost 299 (yen).

In this way, the fifth example indicates that it is possible to drive the hybrid vehicle V to the destination by electrically driving the hybrid vehicle V 11 (km) after charging the battery unit E4 of the charging device E from the remaining battery level 0(%) to 100(%) at the electricity cost of 130 (yen), and by driving the hybrid vehicle V 13 (km) by burning 1.3 (liter) of gasoline at the gasoline cost of 169 (yen).

Also, the fixed terminal C also calculates the gasoline quantity 2.3 (liter) ((24−(0+10)÷10)÷10=2.3) required for driving the hybrid vehicle V by the electricity-priority driving at section(s) other than the regeneration section(s), based on the distance 24 (km) calculated by subtracting the total distance 6 (km) of the regeneration section(s) from the total distance 30 (km) of the route, the remaining battery level 0(%), the total electric quantity 10(%) regenerated at the regeneration section(s), the electricity consumption rate 10(%/km), and the fuel efficiency 10 (km/liter). Then, the fixed terminal C calculates the gasoline cost 299 (yen) based on the gasoline quantity 2.3 (liter) and the gasoline price rate 130 (yen/liter).

In this way, in addition to the aforementioned possible drive to the destination, the fifth example indicates that it is possible to drive the hybrid vehicle V to the destination by electrically driving the hybrid vehicle V 1 (km) by using electricity of the remaining battery level 0(%) and the total electric quantity 10(%) regenerated at the regeneration section(s) without charging the battery unit E4 (i.e. the electricity cost becomes zero), and by driving the hybrid vehicle V 23 (km) by burning 2.3 (liter) of gasoline at the gasoline cost of 299 (yen).

The fixed terminal C displays on the display unit E7 of the charging device E both the energy cost 299 (yen) in the case of adopting the ecology driving (the electricity-oriented driving) and the energy cost 299 (yen) in the case of adopting the low-cost driving (the driving mode whose energy cost is the lowest among driving modes other than the electricity-oriented driving, in this case, the electricity-priority driving) so that the operator can select one of the driving modes.

If the fixed terminal C detects that the operator has selected the low-cost driving via the input unit E3 of the charging device E (in this case, the operator wants the low-cost driving to be adopted if the cost gap between the ecology driving and the low-cost driving is large), the fixed terminal C invites the operator to adopt the ecology driving (the electricity-oriented driving) by informing the operator that there is no difference in energy costs between the ecology driving (the electricity-oriented driving) and the low-cost driving (the electricity-priority driving), sends the value of the recommended charging quantity 10(%) to the charging quantity controlling part E14 of the charging device E so that the charging quantity controlling part E14 can start charging the battery unit E4 with the commercial power source.

The fixed terminal C may display on the display unit E7 of the charging device E a screen for letting the operator confirm the adoption of the ecology driving, and prevent the operator from adopting the low-cost driving (the electricity-priority driving).

Although the fifth example cites the case where the energy cost in the case of adopting the ecology driving has the same value as the energy cost in the case of adopting the low-cost driving, as long as the cost gap is within a predetermined range, the fixed terminal C may regard these energy costs as the same even if there exists a cost gap.

By having the above-mentioned configuration, since the energy replenishment quantity control system 100 allows an operator to determine a driving policy while allowing the operator to compare respective energy costs in using respective energy sources, the energy replenishment quantity control system 100 can realize just enough energy replenishment which is consistent with the desired driving policy.

In addition, since the energy replenishment quantity control system 100 calculates respective energy costs in using respective energy sources, the energy replenishment quantity control system 100 can allow the operator to select a driving mode having the lowest energy cost.

Moreover, since the energy replenishment quantity control system 100 calculates a recommended charging quantity in consideration of an electric energy regenerated during the hybrid vehicle V travels to a destination, the energy replenishment quantity control system 100 can prevent needless charging reliably and reduce cost burden of the operator.

Furthermore, since the energy replenishment quantity control system 100 recommends the ecology driving without imposing a large cost burden on the operator, the energy replenishment quantity control system 100 can make operators who are not ecologically minded more aware of environmental protection.

[Second Embodiment]

Figure 8:
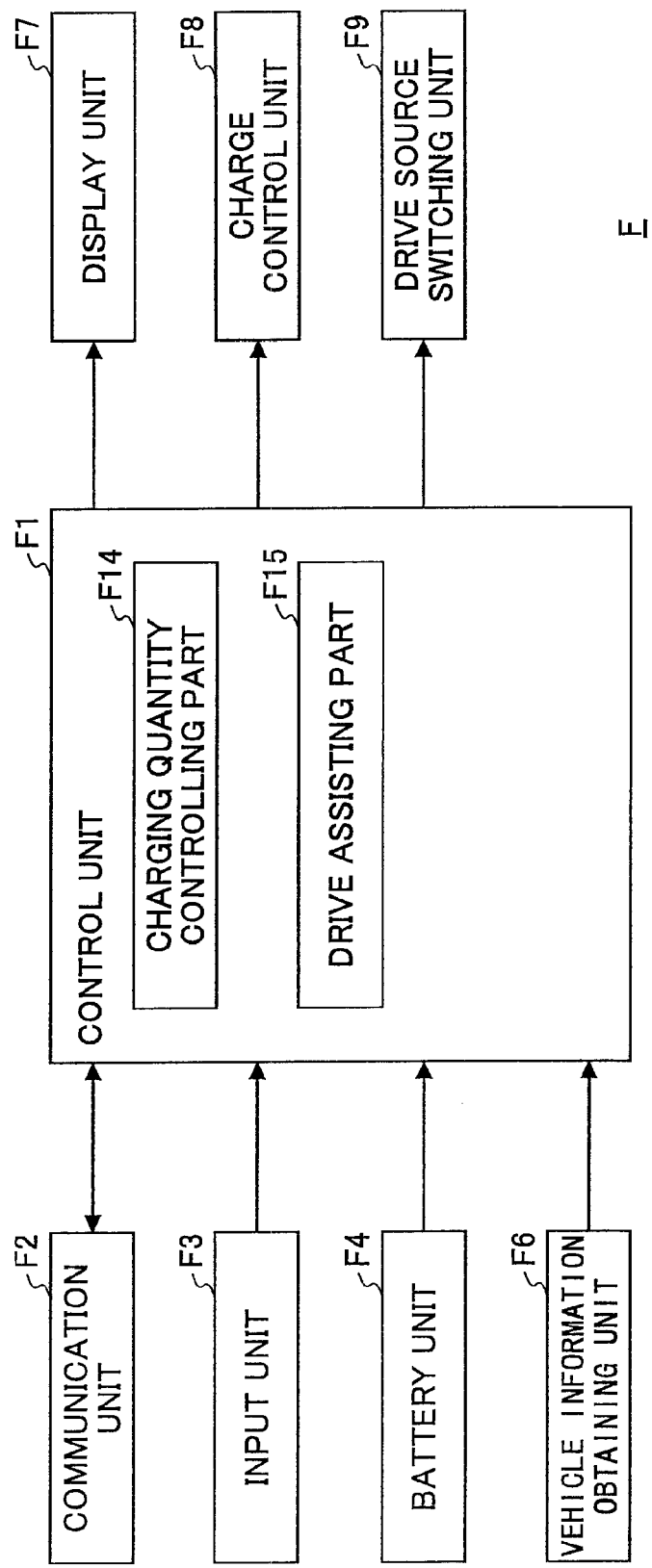
FIG. 8 is a block diagram illustrating a second embodiment of a charging device.

Next, with reference to FIGS. 7 and 8, another example of an energy replenishment quantity control system is explained. FIG. 7 is a block diagram illustrating an example of an energy replenishment quantity control system 200. FIG. 8 is a block diagram illustrating an example of a charging device F in the energy replenishment quantity control system 200.

As shown in FIG. 7, the energy replenishment quantity control system 200 is different from the energy replenishment quantity control system 100 shown in FIG. 1 in respect that the function of the in-car terminal Q is incorporated into the charging device F. The energy replenishment quantity control system 200 is similar to the energy replenishment quantity control system 100 in other respects.

As shown in FIG. 8, the charging device F is different from the charging device E shown in FIG. 2 in respect that the charging device F has a vehicle information obtaining unit F6 and a drive source switching unit F9 and that a control unit F1 has a drive assisting part F15. The charging device F is similar to the charging device E in other respects.

In this way, the energy replenishment quantity control system 200 can charge the battery unit E4 with the commercial power source while the charging device F remains mounted to the hybrid vehicle V without detaching the charging device F from the hybrid vehicle V.

Alternatively, the energy replenishment quantity control system 200 may charge the battery unit E4 after detaching the charging device F from the hybrid vehicle V.

[Third Embodiment]

Figure 9:
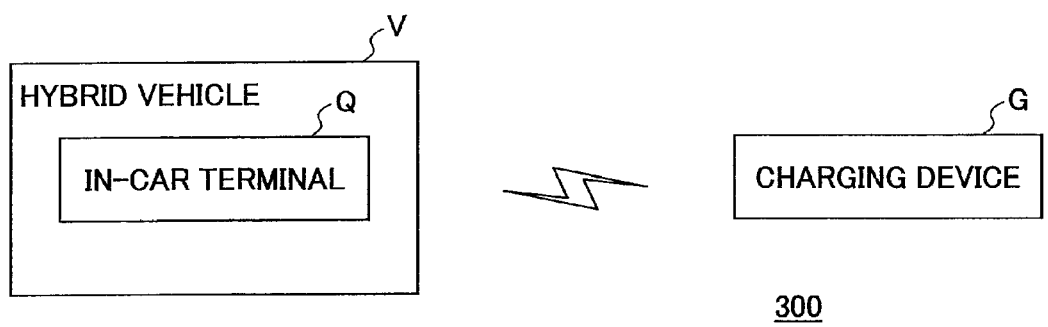
FIG. 9 is a block diagram illustrating a third embodiment of an energy replenishment quantity control system.
Figure 10:
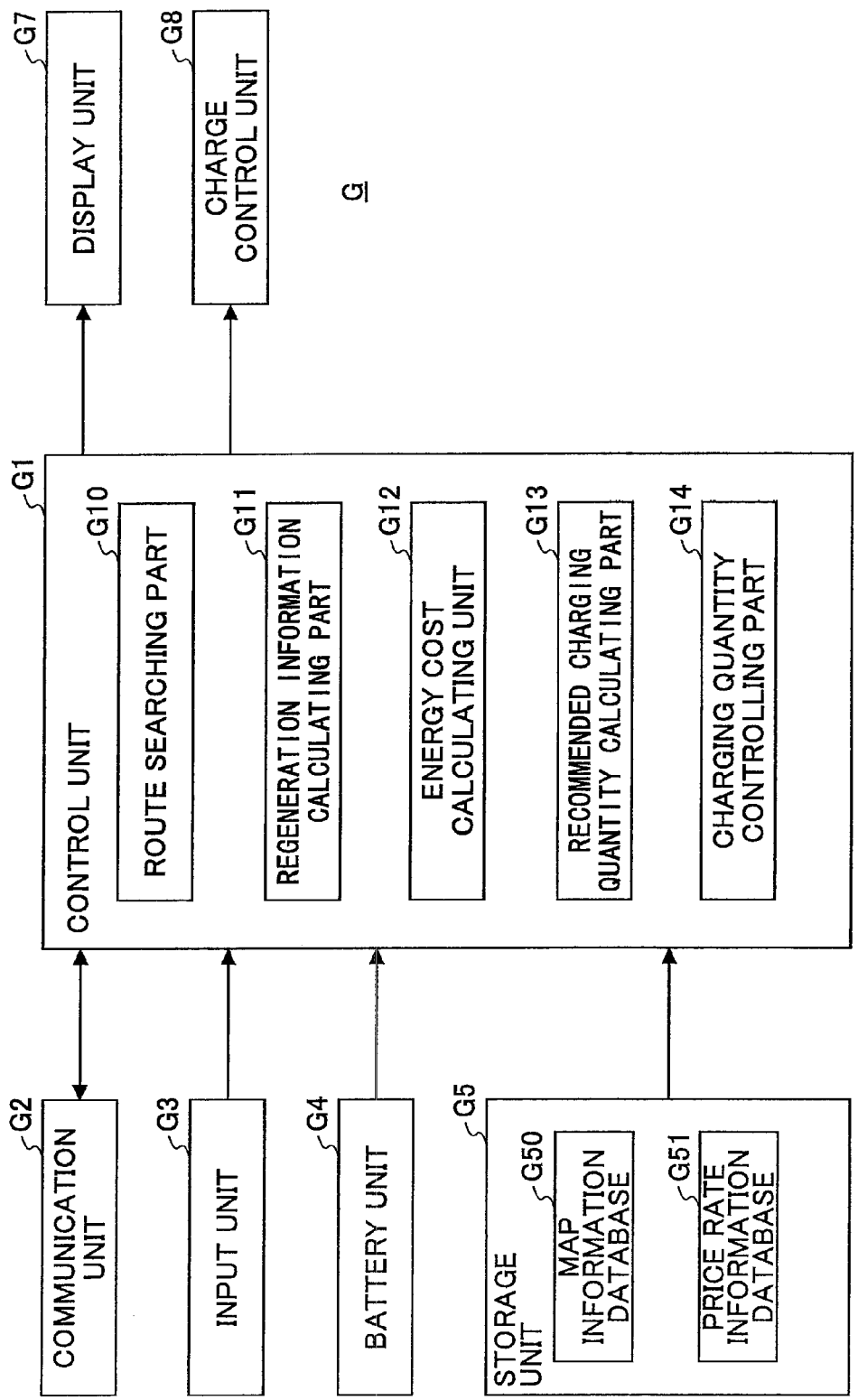
FIG. 10 is a block diagram illustrating a third embodiment of a charging device.

Next, with reference to FIGS. 9 and 10, yet another example of an energy replenishment quantity control system is explained. FIG. 9 is a block diagram illustrating an example of an energy replenishment quantity control system 300. FIG. 10 is a block diagram illustrating an example of a charging device G in the energy replenishment quantity control system 300.

As shown in FIG. 9, the energy replenishment quantity control system 300 is different from the energy replenishment quantity control system 100 shown in FIG. 1 in respect that the function of the fixed terminal C is incorporated into the charging device G and that the energy replenishment quantity control system 300 does not use the communication center S. The energy replenishment quantity control system 300 is similar to the energy replenishment quantity control system 100 in other respects.

As shown in FIG. 10, the charging device G is different from the charging device E shown in FIG. 2 in respect that the charging device G has a storage unit G5 for storing a map information database G50 and a price rate information database G51 and that a control unit G1 has a route searching part G10, a regeneration information calculating part G11, an energy cost calculating part G12, and a recommended charging quantity calculating part G13. The charging device G is similar to the charging device E in other respects.

In this way, since the energy replenishment quantity control system 300 performs within the charging device G the route search and the calculation of the regeneration information, the energy cost, and the recommended charging quantity, the energy replenishment quantity control system 300 can realize just enough energy replenishment which is consistent with the desired driving policy without being swayed by communication environment.

[Fourth Embodiment]

Figure 11:
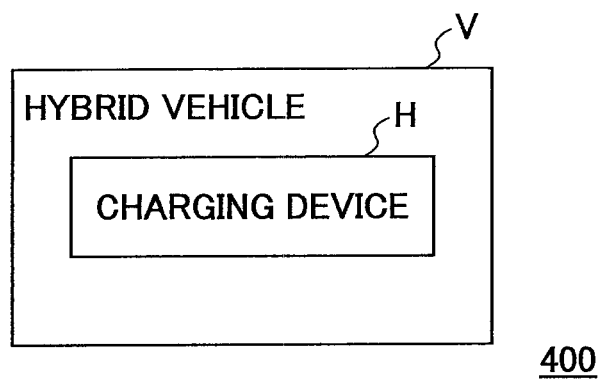
FIG. 11 is a block diagram illustrating a fourth embodiment of an energy replenishment quantity control system.
Figure 12:
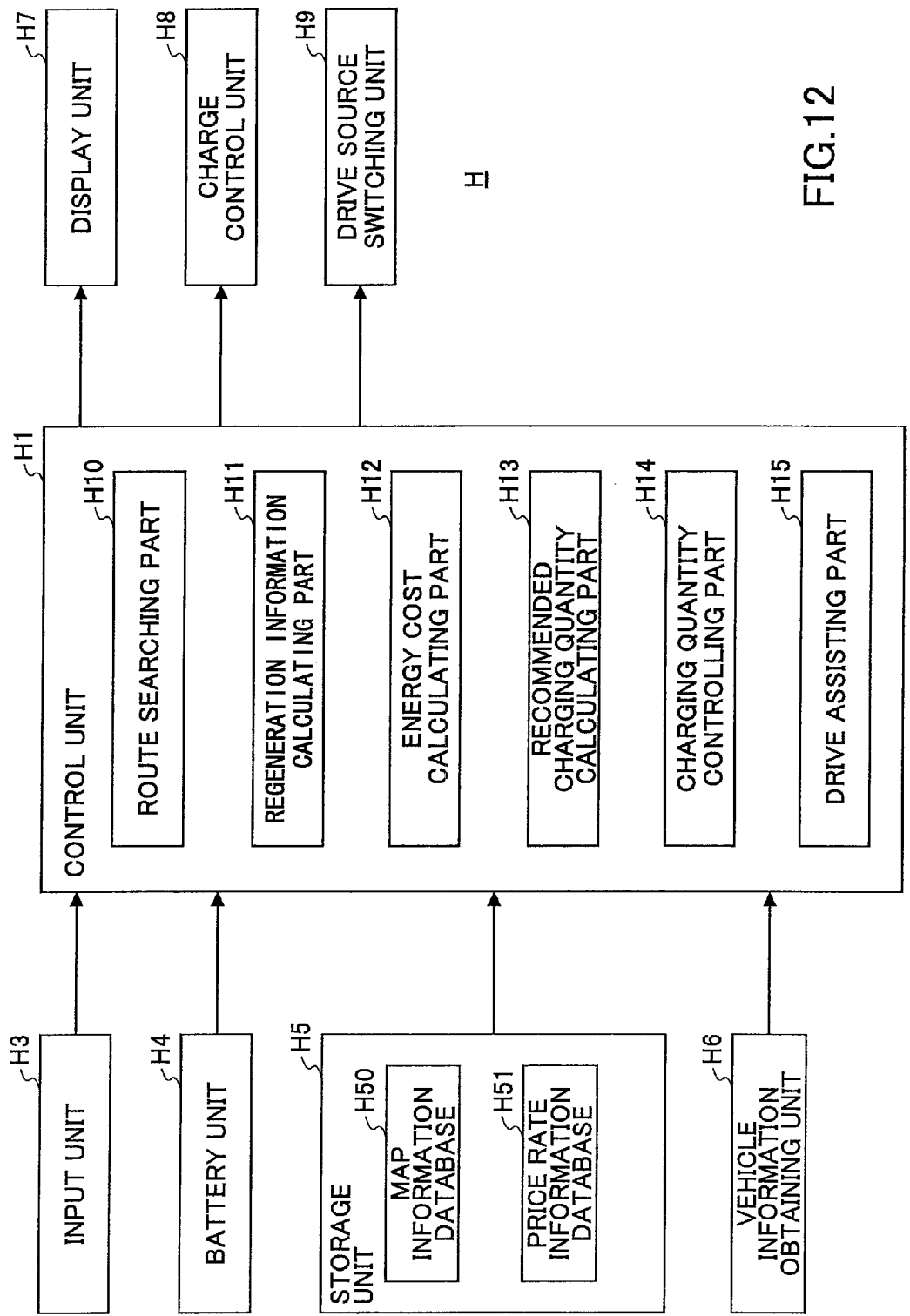
FIG. 12 is a block diagram illustrating a fourth embodiment of a charging device.

Next, with reference to FIGS. 11 and 12, yet another example of an energy replenishment quantity control system is explained. FIG. 11 is a block diagram illustrating an example of an energy replenishment quantity control system 400. FIG. 12 is a block diagram illustrating an example of a charging device H.

As shown in FIG. 11, the energy replenishment quantity control system 400 is different from the energy replenishment quantity control system 300 shown in FIG. 9 in respect that the functions of the in-car terminal Q and the fixed terminal C are incorporated into the charging device H. The energy replenishment quantity control system 400 is similar to the energy replenishment quantity control system 300 in other respects.

As shown in FIG. 12, the charging device H is different from the charging device G shown in FIG. 10 in respect that the charging device H has a vehicle information obtaining unit H6 and a drive source switching unit H9 while omitting a communication unit and that a control unit H1 has a drive assisting part H15. The charging device H is similar to the charging device G in other respects.

In this way, since the energy replenishment quantity control system 400 can have the battery unit H4 charged with the commercial power source while the charging device H remains mounted to the hybrid vehicle V without detaching the charging device H from the hybrid vehicle V, and since the energy replenishment quantity control system 400 performs within the charging device H the route search and the calculation of the regeneration information, the energy cost, and the recommended charging quantity, the energy replenishment quantity control system 400 can realize just enough energy replenishment which is consistent with the desired driving policy without being swayed by communication environment.

Alternatively, the energy replenishment quantity control system 400 may have the battery unit E4 charged and perform the route search and the calculation of the regeneration information, the energy cost, and the recommended charging quantity, after detaching the charging device H from the hybrid vehicle V.

[Additional Statement]

Although the present invention has been described above with respect to preferable embodiments, the present invention is not to be thus limited, and the above-described embodiments are to receive various modifications and substitutions without departing from the scope of the present invention.

For example, in the embodiments above, if the energy replenishment quantity control system 100 confirms that the operator desires the low-cost driving, the energy replenishment quantity control system 100 adopts without change the low-cost driving (the driving mode whose energy cost is the lowest among driving modes other than the electricity-oriented driving) in the case that a cost gap between the energy cost of the ecology driving (the electricity-oriented driving) and the lowest energy cost among driving modes other than the electricity-oriented driving is greater than or equal to a threshold value T1, whereas the energy replenishment quantity control system 100 invites the operator to adopt the ecology driving instead of the low-cost driving in the case that the cost gap is less than the threshold value T1.

In contrast to this, the energy replenishment quantity control system 100 may adopt the low-cost driving automatically without confirming the operator's desire if the cost gap is greater than or equal to a threshold value T2 (T2>T1).

The energy replenishment quantity control system 100 may also adopt the low-cost driving automatically if the cost gap is greater than or equal to the threshold value T2 even after the energy replenishment quantity control system 100 confirmed that the operator desires the ecology driving.

The energy replenishment quantity control system 100 may also change the ratio between an electricity driving and a fuel driving within the ecology driving of the hybrid vehicle V (i.e. increase the ratio of the fuel driving) so that the cost gap becomes less than the threshold value T1.

The energy replenishment quantity control system 100 may also make driving policies other than the low-cost driving and the ecology driving adoptable. The driving policies include a sport driving (driving which combines the electricity driving and the fuel driving at a predetermined section) which places emphasis on acceleration at a predetermined section (for example, highway or the like).

Although the energy replenishment quantity control system 100 controls the recommended charging quantity of the battery unit E4, the energy replenishment quantity control system 100 may also control a recommended fueling quantity of gasoline or light diesel oil or a recommended replenishing quantity of LPG or hydrogen gas.

The present application claims priority from Japanese Patent Application No. 2007-114405 filed on Apr. 24, 2007, which is entirely incorporated herein by reference.

The invention claimed is:

1. An energy replenishment quantity control system for controlling a replenishment quantity of one kind of energy in a moving body which utilizes more than one kind of energy replenished from outside for a driving which is consistent with a driving policy selected from a plurality of driving policies, comprising:
a route searching part configured to search a route from an energy replenishing location to a destination, when the energy replenishing location is a current position;
an energy cost calculating part configured to calculate more than one energy cost for a single route selected from one or more routes searched by the route searching part in using at least one of the more than one kind of energy based on information about the already-selected single route where the moving body can travel without replenishing the one kind of energy from outside on the way to the destination after having replenished the one kind of energy at the energy replenishing location;
an energy replenishment quantity controlling part configured, during replenishing the one kind of energy at the energy replenishing location, to obtain a recommended energy replenishment quantity calculated based at least on a total distance of the already-selected single route which can be greater than a reachable distance by the one kind of energy, the recommended energy replenishment quantity being required to achieve a driving policy determined based on a difference between two of the more than one energy cost for the already-selected single route and the driving policy selected by an operator, to start replenishing the one kind of energy, and to end replenishing the one kind of energy when a replenished quantity has reached the obtained recommended energy replenishment quantity.

2. The energy replenishment quantity control system according to claim 1, wherein the energy cost calculating part calculates the energy cost based on price rate information of each of the more than one kind of energy and the information about the already-selected single route.

3. The energy replenishment quantity control system according to claim 1, wherein the energy cost calculating part calculates an energy cost based on using a plurality of energies on the already-selected single route.

4. The energy replenishment quantity control system according to claim 1,
wherein at least one of the more than one kind of energy is configured to be regenerated through a movement of the moving body which utilizes the more than one kind of energy,
the energy replenishment quantity control system further comprises a regeneration information calculating part configured to calculate information about the energy to be regenerated on the already-selected single route, and
the energy cost calculating part calculates an energy cost in using each of the more than one kind of energy based on the information about the already-selected single route and the information about the energy to be regenerated calculated by the regeneration information calculating part.

5. The energy replenishment quantity control system according to claim 4, wherein the regeneration information calculating part calculates the information about the energy to be regenerated on the already-selected single route based on map information.

6. The energy replenishment quantity control system according to claim 1, wherein the more than one kind of energy includes electricity and fuel.

7. The energy replenishment quantity control system according to claim 1, wherein the plurality of driving policies include an ecology driving which is a driving for reducing a $CO_2$ emission and a low-cost driving which is a driving for reducing an energy cost.

8. The energy replenishment quantity control system according to claim 7, wherein, if a cost gap between an energy cost in the case of adopting the ecology driving and an energy cost in the case of adopting the low-cost driving is greater than or equal to a threshold value, the energy replenishment quantity controlling part calculates a recommended energy replenishment quantity required to achieve a driving policy having the lowest energy cost calculated by the energy cost calculating part, and controls an energy replenishment quantity based on the calculated recommended energy replenishment quantity to achieve the low-cost driving.

* * * * *